(12) United States Patent
Peting (10) Patent No.: US 10,305,380 B2
(45) Date of Patent: May 28, 2019

(54) SYSTEM AND METHOD FOR EFFICIENT CIRCUIT SWITCHING USING A DOUBLE-ENDED LINE DRIVER CIRCUIT

(71) Applicant: Neofocal Systems, Inc., Portland, OR (US)

(72) Inventor: Mark Peting, Yamhill, OR (US)

(73) Assignee: NEOFOCAL SYSTEMS, INC., Portland, OR (US)

(*) Notice: Subject to any disclaimer, the term of this patent is extended or adjusted under 35 U.S.C. 154(b) by 628 days.

(21) Appl. No.: 14/335,803

(22) Filed: Jul. 18, 2014

(65) Prior Publication Data

US 2015/0364983 A1    Dec. 17, 2015

Related U.S. Application Data

(60) Provisional application No. 62/011,537, filed on Jun. 12, 2014.

(51) Int. Cl.
*H02M 3/158* (2006.01)
*H02M 1/00* (2006.01)
*H02J 1/00* (2006.01)

(52) U.S. Cl.
CPC ........... *H02M 3/158* (2013.01); *H02J 1/00* (2013.01); *H02M 2001/008* (2013.01); *H02M 2001/0054* (2013.01); *H02M 2001/0087* (2013.01); *Y02B 70/1491* (2013.01)

(58) Field of Classification Search
CPC .................................................. H02M 3/158
USPC .......................................................... 327/108
See application file for complete search history.

(56) References Cited

U.S. PATENT DOCUMENTS

| | | | | |
|---|---|---|---|---|
| 7,265,527 B1* | 9/2007 | Haug | ................ | H02M 3/158 323/282 |
| 8,188,682 B2* | 5/2012 | Nalbant | ............ | H05B 33/0818 315/193 |
| 8,847,511 B1* | 9/2014 | Cheng | ................ | H05B 33/0815 315/200 R |
| 2010/0060179 A1* | 3/2010 | Newman, Jr. | ........ | H05B 41/295 315/219 |
| 2010/0060200 A1* | 3/2010 | Newman, Jr. | ...... | H05B 41/2822 315/307 |
| 2012/0217950 A1* | 8/2012 | Peting | ................ | H05B 33/0824 323/312 |
| 2012/0299480 A1* | 11/2012 | Peting | ................ | H05B 37/0263 315/113 |

* cited by examiner

*Primary Examiner* — Jason C Olson
(74) *Attorney, Agent, or Firm* — Miller Nash Graham & Dunn LLP

(57) ABSTRACT

Serial arranged circuits allow multiple different circuit nodes to receive power with a single conductor line carrying current. Data can be transmitted to the serially arranged circuit nodes by modulating the current on the single conductor line. However, switching transistors to modulate current can consume energy. To reduce the switching losses, a double ended driver circuit is disclosed. The doubled ended driver circuit includes switching capacitors and inductors at both ends of a serial string of circuit nodes.

22 Claims, 5 Drawing Sheets

SYSTEM AND METHOD FOR EFFICIENT CIRCUIT SWITCHING USING A DOUBLE-ENDED LINE DRIVER CIRCUIT

RELATED APPLICATIONS

The present U.S. patent application claims the benefit of the previous U.S. Provisional Patent Application entitled "System And Method For Efficient Circuit Switching Using A Doubled Ended Line Driver Circuit" filed on Jun. 12, 2014 having Ser. No. 62/011,537.

TECHNICAL FIELD

The present invention relates to the field of electronic circuits. In particular, but not by way of limitation, the present invention discloses techniques for reducing energy usage in electronic switching circuits.

BACKGROUND

With the rising costs of electricity production and the threat of carbon emission caused climate change, energy efficiency has long been a very important design consideration for the designers of any electronic product. Electric lighting has been improving efficiency by moving from inefficient traditional incandescent light bulbs to fluorescent lighting using compact fluorescent light (CFL) bulbs and light-emitting diode (LED) lighting systems.

In addition to the energy cost savings and the environmental benefits, increased electrical energy efficiency can improve the operating performance of electronic products. For example, by increasing the energy efficiency of any mobile electronic device such as a tablet computer or cellular telephone, the battery-powered operating time of such mobile electronics can be lengthened such that the mobile electronic device can be used for a longer time period between recharges. Thus, there are many reasons to improve the energy efficiency of electronic products.

Electronic circuits consume energy in multiple different manners. Energy is often consumed generating light, generating sound, transmitting a signal, or operating a motor on some type of output circuit. However, energy is also consumed in other unintentional manners. For example, the resistance of transmission conductors causes conductors to heat up thus causing transmission losses. Another type of unintentional loss is switching losses caused by transistors that switch between on and off states. It would therefore be desirable to reduce the unintentional switching losses within electronic circuits to improve energy efficiency.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
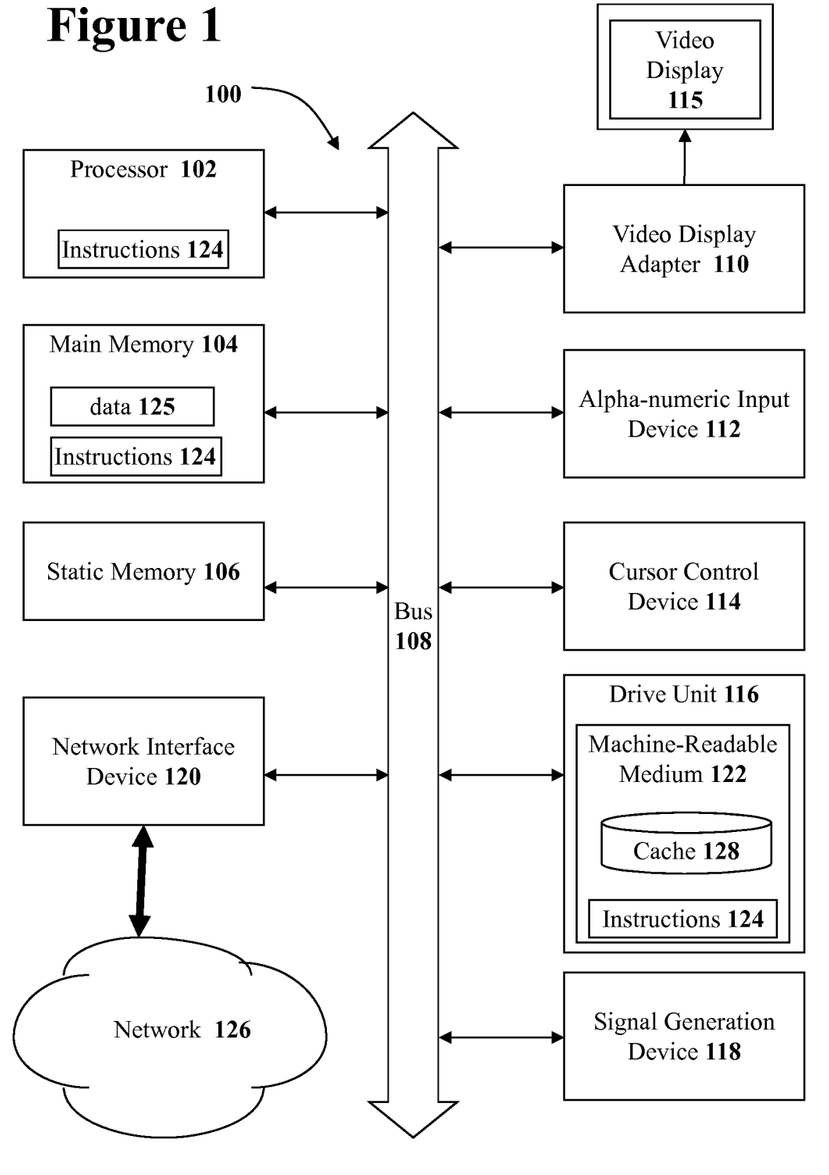
FIG. 1 illustrates a diagrammatic representation of a machine in the example form of a computer system within which a set of instructions, for causing the machine to perform any one or more of the methodologies discussed herein, may be executed.

Some embodiments of the present disclosure may use computer systems since computer systems are very often used to control electrical circuit systems. FIG. 1 illustrates a diagrammatic representation of a machine in the example form of a computer system 100 that may be used to implement portions of the present disclosure or benefit from the disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise)

that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, an output signal generation device 118, and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media. Note that the example computer system 100 illustrates only one possible example and that other computers may not have all of the components illustrated in FIG. 1

The instructions 124 may further be transmitted or received over a computer network 126 via the network interface device 120. Such transmissions may occur utilizing any one of a number of well-known transfer protocols such as the File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

In the present disclosure, a computer system may comprise a very small microcontroller system. A microcontroller may comprise a single integrated circuit that contains the four main components that create a computer system: an arithmetic and logic unit (ALU), a control unit, a memory system, and an input and output system (collectively termed I/O). Microcontrollers are very small and inexpensive integrated circuits that are very often used in digital electronic devices.

Current Loop for Serial Circuit Nodes Overview

Figure 2A:
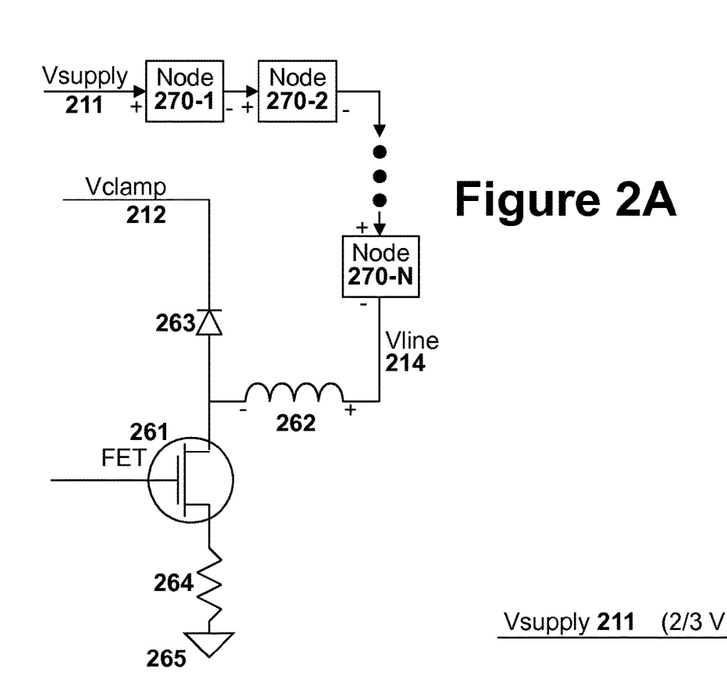
FIG. 2A illustrates a circuit for controlling a current loop used to provide a modulated current loop to a set of controlled circuit nodes that are wired in a daisy-chain manner to receive electrical power and data signals.

FIG. 2A illustrates a switching circuit for controlling a current loop used to provide a modulated current loop to a set of controlled circuit nodes 270-1 to 270-N that are wired in a daisy-chain manner to receive electrical power and data signals. Specifically, a nominally constant current source Vsupply 211 provides nominally constant direct current that passes through a series of circuit nodes 270-1 to 270-N to ground 265. The nominally constant direct current may be modulated using field effect transistor (FET) 261 that may interrupt the current loop thereby modulating changes in the nominally constant current on the line. An inductor 262 ensures that although the current level may be modulated, current will generally continue to flow.

The switching circuit disclosed in FIG. 2A can be used in many different applications wherein a modulated direct current is required. Detailed information on one application of the switching circuit of FIG. 2A can be found in the U.S. Patent entitled "System And Method For Lighting Power And Control System" issued on Jan. 1, 2013 having U.S. Pat. No. 8,344,659 which is hereby incorporated by reference in its entirety.

Figure 2B:
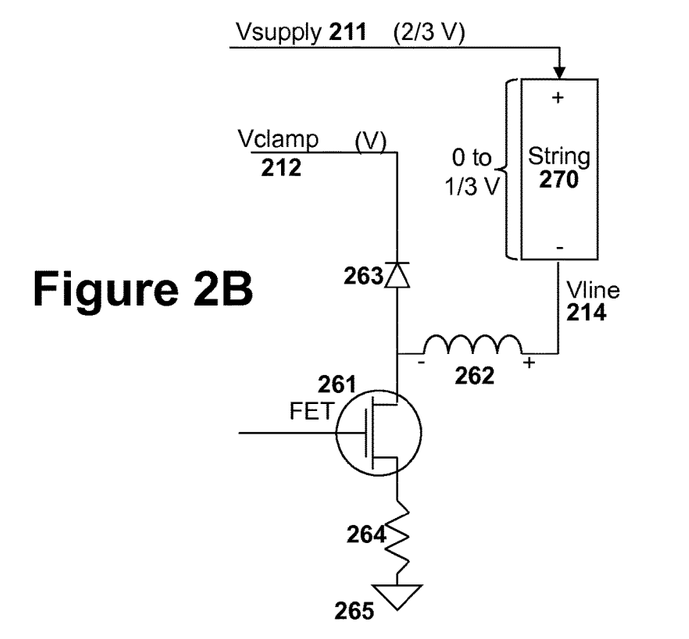
FIG. 2B illustrates the circuit of FIG. 2A wherein the series arranged circuit nodes have been replaced with a block labelled as String and some voltage levels are listed.

FIG. 2B illustrates the circuit of FIG. 2A wherein the series-arranged set of circuit nodes 270-1 to 270-N have been replaced with a block labelled as String 270 to simplify the diagram. All later references to a block labelled 'String' in this document can be replaced with a set of series-arranged set of circuit nodes such as 270-1 to 270-N from FIG. 2A.

In the circuit for controlling a current loop illustrated in FIG. 2B, the highest supply voltage of V Volts is used for Vclamp 212. If the current ramp rate (for modulating the current) on the inductor 262 is to be kept with a 2:1 ratio max:min slope, then the voltage at the string supply (VSupply 211) should be $\frac{2}{3}$V Volts and the voltage across the String 270 should be between 0 and $\frac{1}{3}$V Volts. Thus, even though V Volts (at Vclamp 212) of potential are required to operate the switching circuit of FIG. 2B, only $\frac{1}{3}$V Volts of potential are supplied to the String 270 that performs the desired work. Thus, much of the volt potential is not used to produce useful work.

In the driver circuit arrangement of FIG. 2B the switching losses of the circuit are significant. Specifically, the switching losses, which have a voltage dependence of $C*V^2$ in the system where C is parasitic capacitance, have a driving voltage that is three (3) times the voltage that can be delivered to the string 270. These switching losses represent energy that will be lost as heat and not able to do productive work. Thus, it would be very desirable to reduce the voltage change relative to the voltage delivered to the string to significantly improve the energy efficiency of the switch circuit of FIG. 2B.

Operating with higher voltages can increase the cost of constructing a circuit. For example, to handle higher voltage levels the electrical components (transistors, inductors, diodes, capacitors, etc.), insulation, and isolation costs of the driver circuit may increase. Thus, in addition to the energy efficiency increases there are additional reasons that obtaining a higher string voltage (the voltage across String 270) relative to supply voltage (the V Volts provided to Vclamp 212 in this circuit) for the driver circuit can be beneficial.

Improved Double-Ended Current Loop Driver Circuit

Figure 3A:
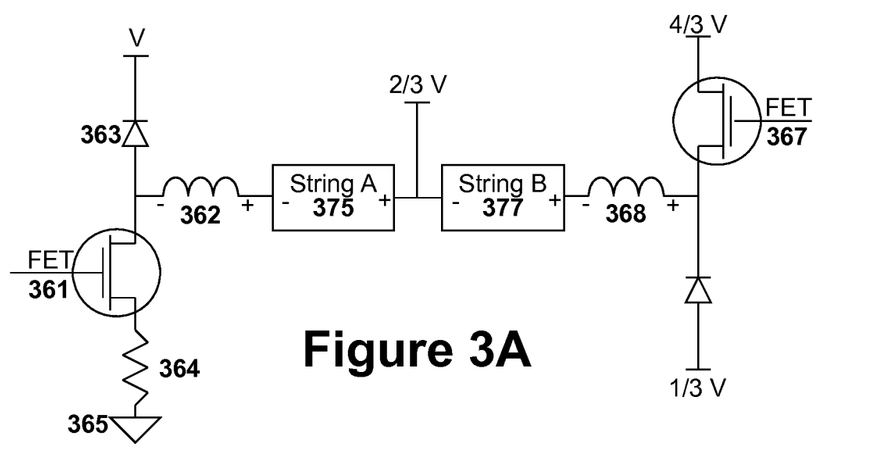
FIG. 3A illustrates a circuit system wherein a copy of the driver circuit of FIG. 2B is mirrored and added to the right of the driver circuit in FIG. 2B.

FIG. 3A illustrates a first improved driver circuit system wherein a copy of the driver circuit of FIG. 2B is mirrored and added to the right of the original driver. Thus, a "double-ended" driver circuit is used to drive the circuit system. The original driver circuit with driver FET 361 drives String A 375 and the mirrored driver circuit with driver FET 367 drives String B 377.

The voltages of the two driver circuits may be adjusted such that the undriven ends of the String A 375 and String B 377 (at the center of FIG. 3A) are both at ⅔V volts as illustrated. If both driver FETs (361 and 367) are being driven with the same control signal, then the center point where ⅔V volts was being supplied can be dropped out since the combined string will still be driven correctly due to the circuit symmetry.

Figure 3B:
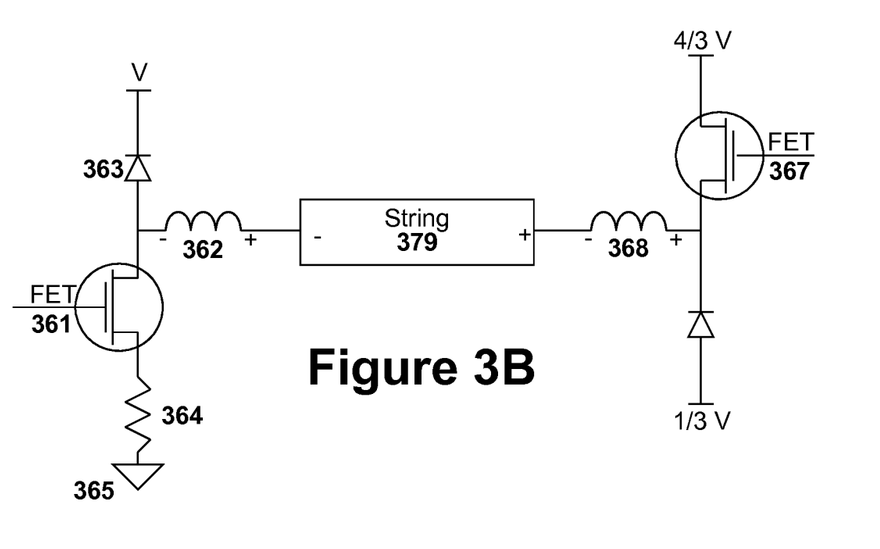
FIG. 3B illustrates the combined system wherein String A and String B of FIG. 3A have been combined into a single String.

FIG. 3B illustrates the combined system wherein the ⅔V source has been dropped out of the center of the diagram and String A 375 and String B 377 have been combined together into a single String 379. The driver circuit is a double-ended driver circuit with a head end comprising FET 367 and inductor 368 and a tail end comprising inductor 362 and FET 361.

In the combined double-ended driver system of FIG. 3B, the highest voltage in the system is ⁴⁄₃V Volts (on the head end of the driver circuit) but the String 379 that performs the work can receive a total of ⅔V Volts to perform useful work. Thus, there is a noticeable improvement in the String 379 voltage (⅔V) to supply voltage (⁴⁄₃V) ratio. Furthermore, the switching circuits on both sides of the line driver circuit see a voltage swing of 1 V volts (V to 0 on the left side and ⁴⁄₃V to ⅓V on the right side) and yet the String 379 obtains ⅔V.

The double-ended line driver circuit of FIG. 3B requires three different voltage sources (V, ⁴⁄₃V, and ⅓V) in order to operate. The next section of this document will describe a double-ended line driver circuit that only uses two voltage sources. The double-ended line driver circuit of FIG. 3B may also be modified by adding zero voltage switch inductors and transistors to the driver circuit in order to reduce the switching losses and turn-on losses in the transistors as will be later described with reference to FIG. 5.

Alternate Double-Ended Current Loop Driver Circuit

Figure 4:
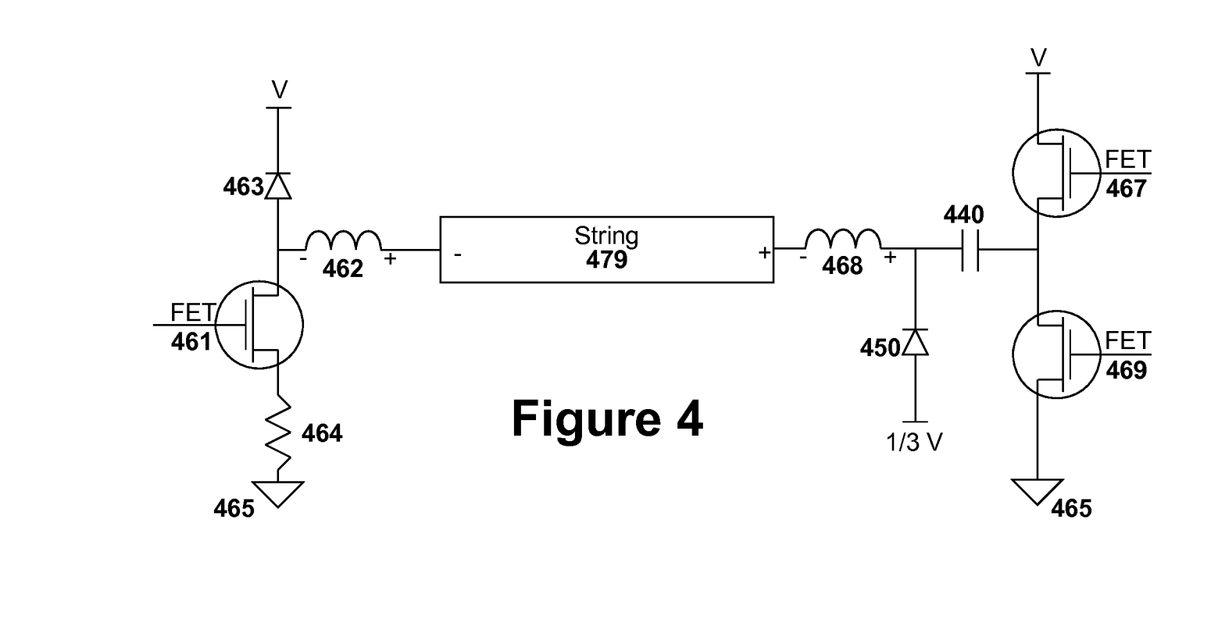
FIG. 4 illustrates a further improved dual-ended driver circuit that has been designed to operate even more efficiently by adding a capacitor.

FIG. 4 illustrates an alternate double-ended driver circuit that has been designed to operate with only two voltage sources (V and ⅓V) instead of the three voltage sources required by the double-ended driver circuit of FIG. 3B. Referring to FIG. 4, the alternate doubled-ended driver circuit includes a Capacitor 440 on the head end driver circuit. During driver circuit operation, the capacitor 440 will maintain a nearly constant voltage of ⅓V Volts thus allowing the two right-hand supply voltages to be shifted down by ⅓V Volts (from the amounts in the right-hand driver circuit of FIG. 3B) to V Volts (at the top of the head end driver circuit) and ground (at the bottom of the head end driver circuit). Whenever tail end driver FET 461 and head end driver FET 467 are turned off then driver FET 469 can be turned on to maintain the ⅓V Volt charge on Capacitor 440 using current passed through diode 450.

With the alternate double-ended driver circuit design of FIG. 4, the voltage across String 479 is ⅔of the system supply voltage of V Volts. This means that supply voltage needed for the circuit in FIG. 4 is one half of the supply voltage required in the original single-ended driver circuit of FIG. 2B to achieve the same voltage across String 479. Thus, the improved double-ended driver circuit of FIG. 4 provides significant advantages over the original single-ended driver circuit of FIG. 2B.

During operation, half of the maximum string output power will always be drawn from the ⅓V Volt supply through capacitor 450. If the voltage across the string 479 is 0 then all of this power (minus losses) will be return out of the V rail. Additional circuitry will need to convert this power and return it to the ⅓V rail. If the voltage across the string 479 is ⅔V Volts, then half the power will still come from the ⅓V Volt supply, but now the other half will come from the V rail supply.

Referring to FIG. 4, the diodes 463 and 450 in the double-ended driver circuit may be replaced by MOSFET switches in order to reduce conduction losses within the circuit. Replacing diode 450 can be more advantageous, since diode 450 carries more average current than diode 463 such that the conduction losses on diode 450 are larger. Furthermore, since diode 450 switches with driver FET 469, a MOSFET switch used to replace diode 450 can be controlled by the same driver line that operates driver FET 469, with simply a level-shifting capacitor coupled to its gate.

Further Improved Double-Ended Current Loop Driver Circuit Variation

The driver circuit of FIG. 4 improves the circuit energy efficiency compared to the original driver circuit of FIGS. 2A and 2B. However, there is still some energy inefficiency within the driver circuit of FIG. 4. For example, the double-ended driver circuit of FIG. 4 still has substantial $C*V^2$ switching losses and Field Effect Transistor (FET) turn-on losses that occur when the various transistors are turned on. Thus, additional improvements can be made to the double-ended driver circuit of FIG. 4 to further reduce the energy losses in the double-ended driver circuit. Specifically, a set of zero voltage switch inductors and transistors may be added to reduce these energy losses that occur within the transistors.

Figure 5:
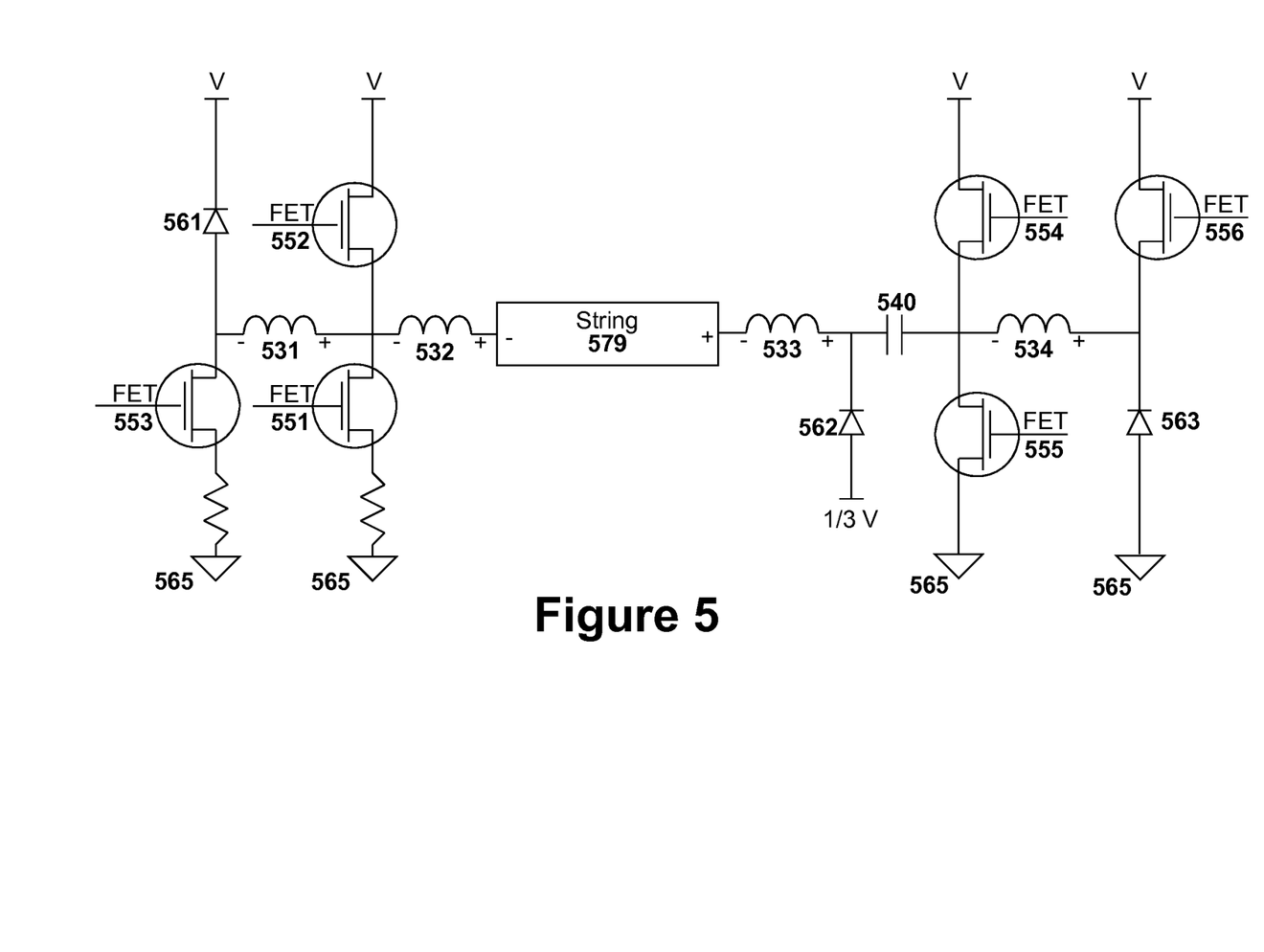
FIG. 5 illustrates a more complex driver circuit that can further reduce the energy losses of the driver circuit.

FIG. 5 illustrates a more complex double-ended driver circuit that can further reduce the energy losses of the double-ended driver circuit of FIG. 4. A key concept in the driver circuit of FIG. 5 is that energy stored as current within inductors can be used to reduce $C*V^2$ or FET turn-on losses by reducing the transistor voltage swings. This is accomplished by adding a set of zero voltage switch inductors and transistors to the driver circuit. These zero voltage switch inductors and transistors cause the voltage difference between the drain and source to be at or around zero volts when a transistor switch occurs.

Referring to the left-hand side of the double-ended driver circuit of FIG. 5, FET 553 is turned on while FET 551 is on. When FET 551 turns off, the current flowing through inductor 532 drives the voltage at the node between FET 551 and FET 552 to V Volts at which point FET 552 can be turned on with very little $C*V^2$ or FET turn-on losses (since there will be no voltage difference between the V Volt source for FET 552 and the V Volts created by inductor 532 at the node between FET 551 and FET 552).

Once the current in inductor 531 ramps up to a value larger than the string current, FET 553 is then turned off. That current in inductor 531 stores energy that will be used to help turn on FETs with little energy loss. Specifically, when FET 553 is turned off, the current in inductor 531 is allowed to circulate via diode 561 and FET 552. Later when FET 552 is turned off, the energy from the current in inductor 531 drives the voltage at the node between FET 551 and FET 552 to 0 V such that FET 551 can then be turned on with very little $C*V^2$ or FET turn-on losses. (Again this is due to zero voltage across FET 551 due to the 0V ground 565 and the 0V created by inductor 531 at the node between FET 551 and FET 552.)

Once the current in inductor 531 decays, the voltage at the node between diode 561 and FET 553 drops to 0 V such that FET 553 can then be turned on with little $C*V^2$ or Field Effect Transistor (FET) turn-on losses. (Once again this is due to zero voltage across FET 553 due to the 0V ground 565 and the 0V between diode 561 and FET 553.) At this point the driver circuit system is back in the starting state for another cycle. Note that with the driver circuit system disclosed in FIG. 5, all of the transistors in the circuit turn on with minimal losses since the transistors turn on at a low voltage.

The preceding paragraph describes the operations of the transistors of the left-hand side of the driver circuit in FIG. 5. The very same set of operations takes place in the mirrored driver circuit on the right-hand side of the doubled-ended driver circuit to achieve the same energy efficiency on the right-hand side driver circuit In some cases adding capacitance across FET 551, FET 553, diode 563 and FET 555 can further improve the energy efficiency of the driver circuit. Specifically, the added capacitance will reduce the voltage swing on transistors as the transistors turn off. Since the capacitance is charged by inductors, to a first order it is lossless, so until the inductor parasitics dominate the system, the reduction in transistor turn off losses can be improved as the capacitor value increases.

Additional modifications may be made to the improved double-ended driver circuit of FIG. 5 to even further improve the efficiency of the driver circuit. For example, as with the driver circuit of FIG. 4, the diodes within the driver circuit illustrated in FIG. 5 may be replaced with transistors to further reduce conduction losses.

As set forth in the description of FIG. 5, a set of zero voltage switch inductors and transistors have been added to the driver circuit design of FIG. 4 to create the driver circuit of FIG. 5. These added inductors and transistors reduce the voltage on transistors when switches of the transistors occur and thereby reduce switching and turn-on losses. These same zero voltage switch inductors and transistors can be added to the driver circuit design of FIG. 3B to reduce the switching and turn-on losses in that particular driver circuit.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. § 1.72(b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

I claim:

1. An electronic circuit for providing a modulated current to a string of circuit nodes coupled together as a series circuit, said electronic circuit comprising:
   a first power supply for supplying a current for said string of circuit nodes;
   a head end driver circuit connected to said string of circuit nodes at a head end, said head end driver circuit comprising a first transistor and a first inductor; and
   a tail end driver circuit separate from the head end driver connected to a tail end of said string of circuit nodes, said tail end driver circuit comprising a second transistor and a second inductor;
   wherein the head end driver circuit and the tail end driver circuit are configured to operate simultaneously and in opposite directions.

2. The electronic circuit as set forth in claim 1 wherein said first transistor and said second transistor modulate data onto said current.

3. The electronic circuit as set forth in claim 1 wherein said head end driver circuit further comprises a second power supply and a diode.

4. The electronic circuit as set forth in claim 1 wherein said tail end driver circuit further comprises a second power supply and a diode.

5. The electronic circuit as set forth in claim 1 wherein said head end driver circuit further comprises a third transistor, a capacitor, a diode, and a second power supply.

6. The electronic circuit as set forth in claim 5 wherein said tail end driver circuit further comprises a third power supply and a diode.

7. The electronic circuit as set forth in claim 5 wherein said third transistor is coupled to said capacitor and ground.

8. The electronic circuit as set forth in claim 1 wherein said head end driver circuit further comprises a zero voltage switch consisting of a zero voltage switch inductor and a pair of zero voltage switch transistors.

9. The electronic circuit as set forth in claim 1 wherein said tail end driver circuit further comprises a zero voltage switch consisting of a zero voltage switch inductor and a pair of zero voltage switch transistors.

10. The electronic circuit as set forth in claim 5 wherein said head end driver circuit further comprises a zero voltage switch consisting of a zero voltage switch inductor and a pair of zero voltage switch transistors.

11. A method of modulating a current for a string of circuit nodes coupled together as a series circuit, said method of modulating said current comprising:
    supplying a base current for said string of circuit nodes from a first power supply;
    modulating said base current with a head end driver circuit connected to a head of said string of circuit nodes, said head end driver circuit comprising a first transistor and a first inductor; and
    modulating said base current with a tail end driver circuit, separate from the head end driver circuit, connected to a tail end of said string of circuit nodes, said tail end driver circuit comprising a second transistor and a second inductor,
    wherein the head end driver circuit and the tail end driver circuit are configured to operate simultaneously and in opposite directions.

12. The method of modulating said current as set forth in claim 11 wherein data is modulated onto said base current.

13. The method of modulating said current as set forth in claim 11 wherein said head end driver circuit further comprises a second power supply and a diode.

14. The method of modulating said current as set forth in claim 11 wherein said tail end driver circuit further comprises a second power supply and a diode.

15. The method of modulating said current as set forth in claim 11 wherein said head end driver circuit further comprises a third transistor, a capacitor, a diode, and a second power supply.

16. The method of modulating said current as set forth in claim 15 wherein said tail end driver circuit further comprises a third power supply and a diode.

17. The method of modulating said current as set forth in claim 15 wherein said third transistor is coupled to said capacitor and ground.

18. The method of modulating said current as set forth in claim 11 wherein said head end driver circuit further comprises a zero voltage switch consisting of a zero voltage switch inductor and a pair of zero voltage switch transistors.

19. The method of modulating said current as set forth in claim 11 wherein said tail end driver circuit further comprises a zero voltage switch consisting of a zero voltage switch inductor and a pair of zero voltage switch transistors.

20. The method of modulating said current as set forth in claim 15 wherein said head end driver circuit further comprises a zero voltage switch consisting of a zero voltage switch inductor and a pair of zero voltage switch transistors.

21. An electronic circuit for providing a modulated current to a string of circuit nodes coupled together as a series circuit, said electronic circuit comprising:
   a first power supply for supplying a current for said string of circuit nodes;
   a head end driver circuit at a head of said string of circuit nodes, said head end driver circuit comprising a first transistor, a third transistor, a capacitor, a diode, a second power supply and a first inductor; and
   a tail end driver circuit separate from the head end driver at a tail of said string of circuit nodes, said tail end driver circuit comprising a second transistor and a second inductor.

22. A method of modulating a current for a string of circuit nodes coupled together as a series circuit, said method of modulating said current comprising:
   supplying a base current for said string of circuit nodes from a first power supply;
   modulating said base current with a head end driver circuit at a head of said string of circuit nodes, said head end driver circuit comprising a first transistor, a third transistor, a capacitor, a diode, a second power supply and a first inductor; and
   modulating said base current with a tail end driver circuit, separate from the head end driver circuit, at a tail of said string of circuit nodes, said tail end driver circuit comprising a second transistor and a second inductor.

* * * * *